United States Patent Office 3,592,779
Patented July 13, 1971

3,592,779
ACID SLUDGE AS BINDER FOR THE PRODUCTION OF SHAPED CARBONACEOUS ARTICLES AND ACTIVATION THEREOF
Oliver A. Kiikka, Willoughby, Ohio, assignor to The Standard Oil Company, Cleveland, Ohio
No Drawing. Filed Nov. 6, 1968, Ser. No. 773,966
Int. Cl. C01b 31/08
U.S. Cl. 252—421                                    4 Claims

ABSTRACT OF THE DISCLOSURE

Acid sludge formed by the reaction of a mineral acid with a relatively high molecular weight hydrocarbon is used to bind various particulate carbon materials into shaped articles which may be activated. The carbon materials useful in this invention are materials such as coke, coal, wood charcoal or any form of carbon produced by charring or destructive distillation of wood, peat, lignite, nut shells, corn cobs, bones, vegetable matter generally, natural and synthetic organic polymers, or other carbonaceous matter, including liquid and liquefiable petroleum fractions. The carbon content of materials used for admixing with the acid sludge ranges from about 10 percent for bone charcoal to 98 percent or higher for some wood chars. The approximate bulk density of useful carbon materials ranges from 0.08 to 2.50.

BACKGROUND OF THE INVENTION

Acid sludges are produced in the manufacture of detergent alkylates, the processing of alcohols, and as the result of various petroleum refining operations, particularly the sulfuric acid treatment of gasoline, the treatment of phenol-extracted oils with fuming sulfuric acid (or sulfur trioxide) which yields "white oils," and in the manufacture of lubricating oils, mineral seal oils and higher boiling petroleum distillates. The alkylation of benzene or toluene with propylene tetramer and the like for the production of detergent alkylates provides a useful sludge. Other useful sludges are obtained in the alkylation of benzene with ethylene to make ethylbenzene or with propylene to make cumene; the alkylation of aliphatic compounds such as isobutane and normal butane with butenes to make high-octane blending stock in conventional petroleum refining operations does not usually yield an "acid sludge" as such, the spent alkylation acid usually being a single liquid phase which will not settle out to any appreciable extent. Often, the spent alkylation acid is confusingly referred to in the art as "sludge," particularly where the immediate problem is its decomposition for recovery of the acid values (see The Oil & Gas Journal Feb. 9, 1950, page 80 and Jan. 18, 1954, page 102).

In general, alkylation reactions in which the acid throws down a sedimentary phase will yield useful sludges, though acid layers resulting from different treating operations will vary in character depending on the feed, severity of acid treatment and other processing factors. A preferred acid sludge is the tarry residue which settles out of the acid layer obtained in the treatment of predominantly aromatic hydrocarbons with sulfuric acid, which residue consists of a relatively high molecular weight reaction product of the aromatic hydrocarbon and sulfuric acid along with sulfonic acids and unreacted sulfuric acid.

It is well known in the art that an activated carbon useful in a multitude of operations may be made by steaming carbon from various sources, particularly wood charcoal and charcoal made from coconut shells at elevated temperatures. Active carbons have also been made from petroleum cokes which are produced in numerous petroleum refining operations such as cracking, reforming, visbreaking, etc. and from acid cokes made from sludges resulting from the treatment of petroleum distillates with strong mineral acids, particularly sulfuric acid, phosphoric acid and hydrochloric acid. Most preferred are the acid sludges formed by the reaction of strong sulfuric acid or sulfur trioxide with cat light gas oil.

Other mineral acids, such as nitric acid, may be used to form sludges; and the physical and chemical characteristics of the shaped articles formed using other mineral acid sludges will expectedly vary from those formed with a sulfuric acid sludge as binder. Generally the products derived from other mineral acid sludges are not commercially as important as those formed from the sulfuric acid sludges.

The most economical acid for use in the formation of the acid sludges, as defined herein, is the spent sulfuric acid (which itself is often referred to as an acid sludge) obtained from the operation of sulfuric acid alkylation units in conventional refining operations.

The present invention is not concerned with the manner of forming acid sludges or the separation of the acid sludge from the reaction product of a mineral acid and the substantially aromatic material, or the decomposition of acid sludge to recover the acid values. It is concerned with the specific use of the acid sludge as a binder for a carbonaceous material which may then be shaped and treated by conventional methods to form desired shaped articles which may be dried and subsequently activated.

The shaped articles of the instant invention are preferably formed from carbonaceous materials such as acid coke, wood charcoal, bituminous low-ash coal, and charred vegetable materials. Petroleum cokes are used only as "filler" or inert material and are not preferred materials for the production of shaped active carbon articles of the instant invention, though they may be used if a filled, relatively low-activity carbon is desired.

Activated carbon is an amorphous form of carbon which is specially treated to produce a very large surface area ranging from 300 to 2000 square meters per grams, which means that the internal pore structure has been very highly developed and has the ability to adsorb gases and vapors from gases, and dissolved or dispersed substances from liquids. Two distinct types of active carbons are recognized commercially; the liquid phase or decolorizing carbons are generally light, fluffy powders while the gas phase or vapor adsorbent carbons are hard, dense granules or pellets. The active carbons produced by the instant process may have densities tailored for use both for decolorization as liquid phase carbons, as well as for vapor adsortpion as gas phase carbons.

The instant invention is specifically related to the use of mineral acid sludges as a binder for various particulate carbonaceous materials such as hardwood and softwood charcoals, fruit pits, nutshells, vegetable wastes, bagasse, and lignin, rice hulls and the like; in the mineral category carbonaceous materials such as anthracitic and bituminous coals, lignite, petroleum residues, carbon black, and active carbons may all be used. Preferred carbonaceous materials are acid cokes made by the coking of acid sludge by any known process, wood charcoal, bituminous low-ash coal, and charred nut shells.

Generally, small shaped articles of a nominal diameter of less than 0.25 inch are preferred for the use of clarification beds for the purification of water or the clarification of various organic and inorganic solutions. It is generally preferred to have the particles composing this bed relatively round, that is a "roundness" in the range of 0.5 to 1.0, for the simple reason that roundness in this range, or rather a lack of angularity, appears to decrease the tendency of bridging of the particles in the bed. "Roundness" is expressed as the average radius of corners and edges divided by the radius of the maximum inscribed circle. Roundness is not necessarily the same as sphericity and is usually defined as the ratio of the nominal diameter of a particle to the maximum intercept of the particle. The nominal diameter is the diameter of the sphere having the same volume of the particle. The maximum intercept is the diameter of a sphere circumscribing the particle. Thus, though roundness and sphericity are the same for a perfect sphere, namely unity, it is possible to have a particle with a high sphericity but low roundness and vice versa. A more detailed discussion of both terms may be found in Stratigraphy and Sedimentation by Krumbein and Sloss, pages 78 to 83 (W. H. Freeman Company, San Francisco, 1951).

The shaped articles of the instant invention may be made in any predetermined size, preferably by first forming the dough-like material which results upon mixing the carbon material with the acid sludge binder of the instant invention. More particularly, the instant invention discloses a method for forming small rounded particles simply by mixing a sufficient quantity of carbonaceous material with acid sludge which forms a dough-like mass and subsequently "breaks" into small green wet rounded particles.

It is a surprising feature of the instant invention that the green wet rounded shaped articles, formed when the pasty dough-like mass passes the inversion point, do not adhere to each other nor do they adhere to the sides of the vessels containing them, thus permitting them to be sieved for size, the preferred size range being processed further. Green wet rounded shaped articles which are not in the desired size range may be recycled for re-use in fresh pastes to form rounded shaped particles of the desired size.

It is speculated that the addition of the acid sludge to form the mixture which subsequently evolves as the shaped article is in the nature of a chemical treatment, although the fact that it imparts the peculiar dough-like consistency to the mixture and the additional property of permitting said dough-like mixture to "break" would indicate that it also acts physically.

More specifically, acid sludge has never been regarded in the art as a binder. For example, U.S. Patent No. 2,718,505 discloses that "The sludge and tar are mixed in proportions varying from 1:1 to 10:1, preferably 2.5:1 to 5:1. The acid sludge is usually a thick, non-fluid mass." This patent indicates that the acid sludge was used for its ability to form a coke, subsequently activable to an activated form, rather than as a treatment aid for a carbonaceous mixture.

This is further reinforced by the disclosure of U.S. Patent No. 2,790,511 wherein a liquid acid sludge is used in combination with the coke particles in a decomposition zone where the liquid sludge is carbonized rapidly by contact with the preheated coke particles (bottom of column 1).

The rounded shaped particles formed upon an inversion of the dough-like mass mentioned hereinabove range in size from about .020 inch to about 0.50 inch nominal diameter. The roundness of the particles after the inversion point is generally greater than 0.4, and may be in excess of 0.9 for a particular size range.

Coupled with the ability to be molded, extruded or briquetted into any desired shape, such as pellets, granules, spherical globules, cylindrical elements, sheets and the like, carbon material with this acid sludge as binder, displays upon drying, exceptional resistance to abrasion, hardness and strength. Moreover they retain their toughness after activation. Another characteristic which is important to most users of granular activated carbon is the apparent density of packed carbon particles. This is also called the apparent bulk density. Other things being equal, it is advantageous to pack a given weight of carbon particles into as small a volume as possible. The corollary to this is that the greater the weight of carbon particles which may be packed into a given container, other things being equal, the greater will be the adsorption capacity of that container. One of the advantages of forming particles of a predetermined shape is that with particles of uniform density and approximately uniform size, the resistance of each unit weight of the particles offered to the passage of gases through a mass of particles in a bed may be easily calculated, and the lowest resistance chosen, if such be desired, by using particles which are appropriately shaped.

The products of the instant invention may be utilized in various industrial processes. For example, a wet green compacted shaped article formed from acid sludge and a bituminous coal in a size range smaller than 100 mesh, may be dried at relatively low temperatures to form electrodes. The dried shaped articles may be used as catalyst supports, either by impregnation of the catalyst on the surface, or within the pores of said dried article. The dried shaped article may be activated and used for the removal of color and other impurities from liquids, the removal of vapors from gases, purification of air, as a catalyst, and in general it may be applied wherever adsorptive decolorizing or purifying material with good structural character is required. Among specific uses of the activated product are the refining and decolorization of oils and their derivatives; the refining and decolorizing of mineral, animal and vegetable oils as a catalyst; as an ion exchange material; for decolorizing, purifying and refining sugar solutions and syrups such as those from cane, corn, maple and sorghum, glycerine, and aqueous and nonaqueous solutions of organic and inorganic compounds; in the purification of water and as a deodorant. Other uses are: in the purification of gelatins, phenols, drugs, pharmaceuticals, and in the bleaching and purification of various crude and partly refined off-grade and off-flavored food and vegetable oils, including cotton seed, linseed, rape-seed, cocoanut, soybean, and animal oils and fats, such as lard, fish oils, medicinal oils, etc. Some special fields of application are: Industrial water, sewage effluent, paints, oils, varnishes and resins, and medicinals in general.

DESCRIPTION OF PRIOR ART

The prior art discloses numerous processes for the decomposition of acid sludges to form acid cokes and of acid cokes converted to active carbons generally characterized by their resistance to abrasion, relative hardness and strength developed during the charring and subsequent heating up to an activating temperature.

In general, activated carbons are produced by first carbonizing suitable organic material resulting in a coke-like product and then activating the carbonized material by any of a variety of treatments which changes its surface and adsorptive characteristics to provide a multitude of pores and a large surface area.

U.S. Pat. No. 2,648,637 discloses a process for making substantially spherical particles from carbonaceous materials by employing two binders one of which is mixed with the pulverized carbonaceous material while in a comminuted and dry state, and the other of which is a sticky binder which when added to the dry mixture causes the particles thereof to adhere to each other. Finely divided carbonaceous materials are mixed with wood or coal tar pitch, preferably the type known as core pitch which is resistant to activation after being charred and which is designated as the permanent binder. To the dried mixture of pulverized materials is then added a sticky binder such as a molasses solution. The mixture is then tumbled in a barrel or a cement mixer with vanes removed on a substantially horizontal axis. After a while the tumbling, moist binder starts to form spheres which increase in size as the tumbling continues. The rotation is stopped when the desired size is reached.

U.S. Pat. No. 2,929,684 discloses the decomposition of hot "acid sludge" with the resulting formation of dry granular coke. Sludge particles are preheated to a temperature not over 50° F. in excess of the decomposition temperature of the particular sludge being used, and are admixed with a stream of hot coke particles moving continuously in a closed cycle. Enough coke particles are used to supply the heat required to elevate all of the sludge introduced to at least the decomposition temperature. This splits off sulfur dioxide contained in the acid sludge along with only a very few percent of hydrocarbons in the gas phase, leaving a dry granular residue which adds to the coke particles in the stream. It will be noted that, in the process disclosed in the instant patent, hot sludge is coated on hot coke particles so as to liberate the sulfur content of the sludge prior to carbonization of the combined sludge and coke particles. It was found that sludges, particularly those of a titratable acidity of at least 75 percent (such "sludges" would be similar to spent alkylation acids), can be processed continuously with substantially complete decomposition of the acid and the production of a free-flowing granular coke residue, if prior to the mixing of the sludge with the coke particles the sludge is commingled with a relatively small amount of bituminous coal (the term bituminous coal denotes coal with a so-called volatile content of at least 25 percent and an average particle size of about 100 microns or smaller) and intimately mixed with the sludge in any suitable mixing device. The coal may vary within the limits of from 5 to 25 percent by weight in relation to the sludge, the larger amounts being required for those sludges with the higher titratable acidity.

U.S. Patent No. 2,586,889 discloses an adsorbent activated coke prepared from petroleum coke by treating the coke with steam at a temperature of 1350° F. to 1500° F. until a yield of coke of about 70 to 90 percent is obtained. The activated coke is prepared as follows: Tarry acid sludge is introduced into a decomposition zone where it is carbonized by contacting it in the absence of air with a mass of hot coke and maintained with continuous stirring at a temperature of 400° F. to about 750° F. for a sufficient time to distill out the bulk of the volatile matter present in the sludge. The carbonized sludge is then transferred to a kiln where it is partially burned with air at a temperature of 650° F. to 1200° F., preferably 1000° F. to 1200° F., for enough time to form the type of coke desired. The bulk of the resulting hot coke is recycled to the decomposition zone to maintain the mass of coke therein and to supply the necessary heat for the carbonization; the balance of the coke is removed as the desired product which is cooled and comminuted to the desired size. In the instant invention the acid sludge is used as a binder for the particulate carbonaceous material well below a temperature at which any volatiles will be driven off, at which no carbonization due to temperature occurs, and the mixing is carried out substantially at room temperature.

In U.S. Patent No. 1,763,102 is disclosed the utilization of a petroleum carbon and a carbonaceous substance produced from a cellulose organic material such as sawdust to form a homogeneous mixture, allowing the acid to attack and disintegrate the cellulose, treating with steam to drive off the volatiles, and recovering the resulting activated product.

In U.S. Patent No. 1,989,107 is disclosed a process for making non-structural adsorptive or activated carbons in which it is not important that the supporting walls of the individual particles be dense or firm or that the particle grain itself possess the structural strength required of the granular type of carbons.

U.S. Patent No. 2,718,505 discloses that activated carbon of high adsorptive capacity can be produced in high yields by mixing tars and/or pitches with acid sludges and converting the mixture to coke, which is then activated in the usual manner. The sludge and tar are mixed in proportions varying from 1:1 to 10:1, preferably 2.5:1 to 5:1, which forms a mobile mass which is first distilled at a slow rate until the temperature reaches about 750° F. and then is coked in a reactor at a temperature of 1100° F. to 2000° F. The crude coke is then subjected to a third treatment which is an activation process to reduce it to activated carbon.

Preparation of carbonaceous cation materials by the sulfonation of materials such as bituminous coal, peat, etc. has been described in a number of publications. U.S. Patent No. 2,748,057 discloses that the reaction product of an asphalt-type bituminous material with concentrated sulfuric acid further reacted with oleum provides highly satisfactory carbonaceous cation exchange material. U.S. Patent No. 2,382,334 describes a process for the preparation of cation exchange materials by sulfonation with, and resulfonation with, sulfur trioxide gas.

SUMMARY OF THE INVENTION

It is an object of the instant invention to provide a shaped article which is formed by binding a particulate carbon material with acid sludge at a temperature lower than the decomposition temperature of said acid sludge.

It is another object of the instant invention to form a shaped article by the admixing of a smaller than 42 mesh particulate carbon material such as coke, coal, wood charcoal, or any form of carbon produced by charring or destructive distillation of wood, peat, lignite, nut shells, corn cobs, bones, natural and synthetic organic polymers, and vegetable matter generally, and acid sludge in a ratio of acid sludge to carbon material in the range from 2:1 to 1:10 by weight.

It is another object of the instant invention to provide a shaped material of a mixture of acid sludge and a finely divided carbon material, which is subsequently dried to drive off the volatiles at a temperature lower than that necessary to carbonize the article.

It is another object of the instant invention to provide a shaped article formed by mixing an acid sludge with a substantially moisture-free carbon material capable of passing through (and therefore smaller than) a 100 mesh screen in more than one part of carbon material to one part of acid sludge by weight, which is subsequently dried and heated to a temperature above 350° F. but below a temperature necessary to activate the carbon material.

It is another object of the instant invention to provide a shaped article consisting essentially of acid sludge mixed with more than an equivalent weight of a finely divided carbon material which is then dried at a temperature below 850° F., and finally activated by heating in the presence of a mild oxidizing agent such as steam, carbon dioxide and the like at a temperature in excess of 1500° F.

It is another object of the instant invention to provide a catalytic carbon material by binding a finely divided mass of carbon material with the use of an acid sludge binder, the mixture being subsequently dried and optionally impregnated with catalytic components, which components may be mixed either in a slurry form or as aqueous solutions so as to be distributed within the accessible pores of said shaped article.

It is another object of the instant invention to provide a hard, dense, abrasion-resistant, tough and relatively regularly shaped article, consisting essentially of an activated carbon material formed by reacting a sulfonating agent with a predominantly aromatic, relatively high molecular weight compound to form an acid sludge in situ, and simultaneously introducing a particulate carbonaceous material into the reaction mass, subsequently shaping the paste-like material and drying said material.

It is another object of the instant invention to provide a process for producing relatively uniform, generally spherical, globular particles from a mixture of acid sludge (obtained by the reaction of a relatively concentrated sulfuric acid with an aromatics-containing petroleum residue, as the bottoms product of said reaction), with a particulate carbon material smaller than 100 mesh, which may be a non-active form of carbon such as lignite, acid coke and the like, or any active form of carbon such as Aqua Nuchar and the like, and adding a sufficient quantity of said particulate carbon material continuously to the constantly stirred mass until it reaches an inversion point, namely, where the homogeneous paste-like mass breaks up into a plurality of generally globular particles.

It is another object of the instant invention to provide relatively small articles particularly suited for the low pressure drop operation of cation exchange and catalyst beds, by comminuting materials such as carbonaceous cation exchange materials, carbon supported catalysts, and the like, and binding said finely divided carbon materials with acid sludge to form articles of any desired degree of roundness.

It is still another object of the instant invention to provide a process for forming relatively small shaped articles of a predetermined degree of roundness by mixing with a relatively low-shear, folding action a finely divided carbon material with an acid sludge binder in such proportions as to form a doughy mass and continuing to mix said doughy mass until it breaks up into a multitude of shaped articles smaller than 0.25 inch nominal diameter, with the desired degree of roundness.

PREFERRED EMBODIMENT OF THE INVENTION

Any acid sludge with a substantial hydrocarbon content may be used, but preferred sludges, with their approximate hydrocarbon contents are those shown below:

| Sludge source | Sludge analyses, percent | | |
|---|---|---|---|
| | Acid | Water | Hydrocarbons |
| Mineral seal oil sludge | 65 | 10 | 25 |
| Lube-oil sludge | 60 | 10 | 30 |
| Ethanol wash-oil sludge | 55 | 30 | 15 |
| Detergent alkylate sludge | 60 | 7 | 33 |

An acid sludge obtained from the treatment of a petroleum stock for the manufacture of mineral oil or an acid sludge prepared by the reaction of a relatively concentrated sulfuric acid with an industrial fuel oil cut such as cat light gas oil, is a preferred acid sludge in the instant process.

Specifically, an acid sludge is prepared by the reaction of spent alkylation sulfuric acid with cat light gas oil; the reaction product is allowed to settle and the bottoms withdrawn; the bottoms is the acid sludge.

Addition of the carbon material such as acid coke, an active carbon to be upgraded, charred vegetable material, and the like to a mixing vessel to which acid sludge is charged is done incrementally while the mixing action is progressing. Initially a thin paste is formed, and continued addition of the carbon material causes a thickening of the paste. Further addition of the carbon material causes a heavy paste to form, which in turn is transformed into a doughy homogeneous mass. This dough-like mass is a preferred condition of the material from which the shaped articles of the instant invention are to be formed. This mass may be briquetted, extruded, or molded into any desired shape, depending upon the end use of the product. It is preferred to use a substantially moisture-free carbon material to faciiltate the formation of the doughy mass and to decrease the time required for subsequent drying, a preferred size of material being smaller than 80 mesh.

It is most preferred to use particles smaller than 100 Tyler mesh for rounded shaped articles smaller than 0.25 inch nominal diameter. In the fabrication of large molded electrodes it is sometimes desirable to have coarser particles, called "grit," which may be about 0.25 inch nominal diameter. Grit may be incorporated in the instant shaped articles by using it in conjunction with smaller particles, preferably uniformly graded, much in the same manner as coarse aggregates are incorporated in concrete.

Mixing is done by using a mixer which imparts to the ingredients a folding or tumbling action rather than a high-speed high-shear action. Preferred are mixers such as a Hobart mixer with a rotating blade following peripherally the vessel in which it is being used, a tumbling barrel or conical V-blender, a rubber blending mill or a mixer with twin meshed screws. The most preferred mixer is a variable speed conical V-blender.

The instant shaped articles, in the size range −10 to +180 mesh, with a distinct lack of angularity and a relatively high degree of roundness, are preferred for use in filter beds, fixed and fluid bed reactors and the like. These may be formed, by molding the doughy mass into spherical pellets using conventional molding means. However, they may be formed quite unexpectedly, and much more economically, merely by the continued addition of a further quantity of carbon material to the dough-like mass which, upon continued mixing suddenly "breaks"—a term used to define the point at which the doughy mass suddenly breaks up into a multitude of small relatively regularly shaped globs. The point is also referred to as the "inversion point." The globs formed after the inversion point are referred to as "green wet globs."

Continued mixing past the inversion point will result in a re-agglomeration of the globs into a single doughy mass again, which mass is somewhat less cohesive than it was prior to reaching its first inversion point. Upon still further mixing and the continued addition of a further amount of carbon material the dough-like mass will again "break," going through a second inversion point, and forming distinct globs usually of a shape and size different from those formed after the first inversion point.

The size and relative uniformity of the particles of carbon material used for addition to the acid sludge, and the ratio of the weight of carbon material to the acid sludge, the rate of shear, the type of mixing action, and the temperature at which it is mixed along with the time during which the mixing action was carried out, will determine the precise shape of the wet green globs. Thus particles may be formed which are generally spherical or ellipsoidal, or disc shaped, by varying the mixing conditions, and the shape is retained during further processing. When a molded article is desired, the ratio of the carbon material to the acid sludge in the doughy mass will determine the pressure at which extrusion or molding must be carried out. In general, shaped articles molded with more carbon material in them will require higher pressures.

Quite unexpectedly, globular particles formed as described hereinabove have no tendency to crumble upon standing and may be handled easily. Thus they may be transferred from the mixing vessel to a conveyor belt, or to drying trays or a rotary drier, and sieved for classification by size, without reagglomerating or crumbling.

The instant shaped articles may be formed from commercially available active carbons which are to be upgraded. The high surface area of such a carbon material requires that relatively larger amounts of acid sludge be used, generally in the range from 1.5:1 to 1:5 parts by weight active carbon to acid sludge.

Commercially available cation exchange materials of relatively small irregular shape may be comminuted and mixed with acid sludge to form shaped articles of relatively high roundness and characterized by affording low pressure drops in packed beds. In general, shaped articles so formed exhibit about the same higher cation exchange capability than the original material.

The shaped articles formed as described above, either by mixing and leading the doughy mass through an inversion point, or by working the material by extrusion or molding, are then dried by any conventional method.

The precise process drying conditions of temperature, time, and atmosphere are selected depending upon the size and composition of the article to be dried. Considerations such as the relative speed at which moisture may be removed and the eventual temperature level of drying must be balanced against considerations of loss of acid values and product yields. In general, relatively low temperatures, preferably in the range from 200° F. to 850° F., result in free-flowing particles which show excellent characteristics upon activation. Particularly where a carbon material such as bituminous coal or charcoal of vegetable origin is used, drying is preferably carried out at temperatures below 650° F. At this temperature level, recovery of acid values approximates 90 percent yet provides a tough, non-coring or free-flowing, quickly activable particle.

Any drying atmosphere may be used, or none at all, as in a vacuum. An inert atmosphere of nitrogen is satisfactory as is an atmosphere of fuel gas combustion products. Hot air or combustion gases with an excess of air is preferred. All drying is preferably carried out in forced draft ovens, and air flow is regulated in the range of 0.2 to 5 s.c.f.h. per pound of wet green globs charged to the dryer. The dried globs are referred to as "green dried globs."

The dried articles may be carbonized by further heating to the carbonization temperature of the article, usually in the range of 900° F. to 1200° F. for a period in the range of from one-half hour to 6 hours, depending upon the carbon material used and the size of the article to be carbonized. The carbonized articles are referred to as "sintered globs."

The sintered globs are then activated in any conventional manner. Preferably activation is carried out by charging a reactor with the sintered globs and feeding steam and air at a temperature in the range of 900° C. to 1200° C. The globs in the bed are maintained at the activation temperature for about 30 minutes to 6 hours while the oxidizing gases continue to be passed through the bed. The reactor is then cooled and the globs unloaded. The same procedure may be adopted with any other shaped article to be activated.

The time of activation will depend upon the activation temperature, the composition of the activation gases, the size of the articles being activated, and the type of reactor used. For articles of the same size the time of activation will also be determined by the particular carbon material used, and the preparation history of the article.

A typical activation run of small sintered globs is made by using 100 grams of charge in an activation tube which is brought up to 1800° F. prior to being contacted with about 4 s.c.f.h. of air and 100 grams per hour of steam. Activation is complete in less than 3 hours. Activation may also be carried out using flue gases or nitrogen with steam, but the times of activation and the degree of activation as measured by carbon tetrachloride pick-up will vary.

The instant shaped articles may be used as catalyst supports, their high surface area being ideally suited to the distribution thereon of catalyst elements. This may be accomplished by any means known to one skilled in the art; for example, by slurrying dried shaped articles with a solution of the desired catalyst element and then heat-treating. Alternatively the finely divided oxide itself may be suspended in a fluid and contacted with the rounded particles. The oxides of metals from Groups VIII, VI–B, I–B are particularly easy to deposit on the instant articles, and maintain their catalytic activity very well.

Not all the requirements of the instant shaped articles would be in the form of activated shaped articles. Certain uses might require the shaped article in the green dried state, while others might require the shaped article in the sintered state.

The following examples disclose the preparation of shaped articles of the instant invention. All "parts" referred to are parts by weight unless otherwise specified.

Example 1

An acid sludge was made by reacting spent alkylation acid (sulfuric) with catalytic ("cat") light gas oil (see inspections in Table I), using 9 parts acid to 15 parts cat light gas oil, at 80° C. for 10 minutes. The reaction mixture was cooled and allowed to settle. It yielded 11 lbs. of raffinate and 13 lbs. of acid sludge sediment which was separated. 1.7 parts of acid coke fines (about 49 microns average particle size) were added incrementally to one part acid sludge which was placed in a Hobart mixer, making sure the mixture was homogeneous. A typical sieve analysis for micro-pulverized acid coke is found in Table IV. Initially a thin paste was formed which thickened and subsequently formed a doughy mass which was folded and refolded upon itself within the mixer, keeping the walls of the mixer clean and allowing no accumulation of acid coke particles either on the walls or the blade of the mixer. After the last of the acid coke particles was added to the doughy mass, it "broke" forming a multitude of green wet globs, about half of which were small enough to pass through an 8 mesh screen.

In this, as in the following examples, very few wet green globs are formed which are outside the range of —6 mesh to +40 mesh. Depending upon the carbon material used, the conditions of mixing, and the ratios of carbon material to acid sludge, the proportion of wet green globs within particular size ranges in the overall range vary.

Example 2

One part acid sludge obtained as in Example 1 above was placed in a conical V-blender and 2.8 parts of micro-pulverized lignite (average diameter about 50 microns) was added to the sludge continuously. A doughy mass was formed which broke into a multitude of wet green globs.

Example 3

4 parts acid sludge obtained as in Example 1 above were placed in a Hobart mixer and 2.7 parts carbon black added to it incrementally while mixing continuously. A doughy mass was formed which subsequently broke into a plurality of wet green globs.

Example 4

3 parts acid sludge obtained as in Example 1 above was placed in a Hobart mixer. One part Aqua Nuchar was added incrementally while the mixture was continuously mixed. A doughy mass was formed which broke into a plurality of wet green globs.

Example 5

One part acid sludge obtained as in Example 1 above was placed in a Hobart mixer, and one part micro-pulverized moisture-free Zeocarb, a commercial cation exchange activated carbon, was gradually added thereto. A doughy mass was formed which subsequently broke into a plurality of wet green globs which were spread out thinly and oven dried, first for one hour at 212° F. and then for 15 minutes at 350° F. The dried globs were then boiled in water without disintegrating.

Example 6

4.5 parts acid sludge obtained as in Example 1 above were placed in a Hobart mixer and one part high-surface-area active carbon, such as Columbia ACC made by Union Carbide, was incrementally added while continuously mixing. A doughy mass formed which subsequently broke into a plurality of wet green globs. Similar wet green globs in a size range generally smaller than 0.25 inch nominal diameter with roundness ranging from 0.4 to approximately 0.9 were obtained using wood charcoal, peat charcoal, charred rice hulls, nut shells, corn cobs, anthracite, and sulfur cokes produced by the reaction of sulfur-containing compounds with pitch-like and tarry carbonaceous residues.

Example 7

One part by weight acid sludge obtained as in Example 1 above was placed in a Hobart mixer while 2.1 parts micro-pulverized Roda coal were incrementally added to the sludge while mixing continuously. A typical sieve analysis for micro-pulverized Roda coal is shown in Table IV. A doughy mass was formed which broke into a plurality of wet green globs, more than half of which were smaller than 8 mesh. Similar results were obtained using Austin Black and other bituminous coals.

Example 8

A substantially aromatic high-viscosity refinery stream obtained as a mid-cut of predominantly aromatic decanted oil extract (code named CD 121) may be mixed with spent alkylation acid to form an acid sludge at 80° C. for 10 minutes, in situ directly, obviating the necessity of sedimentation and separation. A physical inspection of CD 121 appears in Table I. Similarly acid sludges may be formed in situ using solvent de-asphalted oil, decanted oil extract or any aromatic-containing streams boiling in the range 430° F. to 1100° F., and similar aromatic stocks in that boiling range obtained from coal tar. Specifically, 350 grams of spent alkylation acid were mixed with 270 grams of solvent de-asphalted oil and 180 grams of acid coke fines, the acid coke fines being added towards the end of the mixing. A doughy mass was formed which broke into a plurality of wet green globs.

Example 9

The above enumerated examples were repeated using a filler material consisting of low-grade petroleum coke to replace up to 50 percent of the acid coke, wood charcoal, or other carbon material used. In each case, mixing was continued until a doughy mass was formed and further continued until the doughy mass broke into a plurality of wet green globs.

Example 10

200 grams spent alkylation acid were mixed with 100 grams decanted oil extract for 10 minutes at room temperature. Then 306 grams of micro-pulverized Roda coal were incrementally added to the mixture. A doughy mass was formed which subsequently broke into a multitude of wet green globs.

Example 11

One part acid sludge obtained as in Example 1 above was placed in a conical V-blender and 1.4 parts Roda coal (average diameter about 50 microns) were added incrementally while mixing. A doughy mass was formed which was extruded in spaghetti form.

Example 12

Cocoanut shell flour (smaller than 100 mesh) was dried at 600° F. for 2 hours to remove the moisture therefrom. One part of the moisture-free flour was added incrementally to 3 parts acid sludge obtained as in Example 1 above in a V-blender until the mixed mass broke up into a plurality of wet green globs.

Example 13

One part acid sludge obtained as in Example 1 above was placed in a Hobart mixer and 1.3 parts calcined petroleum coke (−100 mesh) was added thereto continuously while mixing. A doughy mass was formed which was extruded in a rod.

Example 14

Wet green globs obtained as in the Examples 1–13 hereinabove were dried under various conditions indicated in Table III, resulting in green dried globs. In general drying is carried out first at a lower temperature to drive off moisture and then at a higher temperature to drive off the acid values which usually are to be recovered. The shaped article is further dried at a high temperature sufficient to carbonize the article. The shaped articles may directly be dried at a carbonizing temperature where recovery of acid values is unimportant and the physical characteristics of the shaped article are relatively unimportant. For example wet green globs made with bituminous coal are preferably dried in stages, while those made with acid coke are relatively insensitive to staging of drying temperatures and may be directly dried at carbonizing temperatures.

Example 15

The dried shaped articles of Example 14 were subjected to mildly oxidizing gases at a temperature sufficient to activate the carbon material. In general steam was used either alone or in combination with nitrogen, or in combination with air, or in combination both with air and nitrogen. In general, activation is preferably carried out at temperatures in excess of 1500° F. Typical runs are tabulated in Table V. The examples in Table V correspond numerically to those in Table III. Activity of the carbon material is measured by the weight percent carbon tetrachloride retention of the active globs. This is measured by drying the active carbon sample at 250° F. for 2 hours. One gram of the dried sample is placed in a desiccator with liquid carbon tetrachloride at 75° F. for one hour. The weight increase of the sample is noted, and the result expressed as percent tetrachloride pick-up or retention.

TABLE I.—PHYSICAL INSPECTIONS

| | Toledo cat. light gas oil | No. 2 refinery waxy CD121 |
|---|---|---|
| °API gravity | 27.5 | 1.3 |
| Sp. gr. at 60° F | 0.8899 | 1.0655 |
| Pour point, ° F | | +60 |
| Wt. percent saturates, STM91 | | 8.8 |
| Calc. cetane No. | 33.0 | |
| Molecular weight (Osmometer) | 195 | 256 |
| Viscosity: | | |
| CS at 100° F | 2.75 | 83.48 |
| CS at 210° F | 1.12 | 4.62 |
| SSU at 100° F | | 386.9 |
| SSU at 210° F | | 41.4 |
| ASTM distillation, ° F.: | | |
| IBP | 417 | *673 |
| 5% | 457 | 696 |
| 10% | 469 | 705 |
| 20% | 483 | 708 |
| 30% | 494 | 710 |
| 40% | 504 | 716 |
| 50% | 513 | 718 |
| 60% | 525 | 726 |
| 70% | 539 | 733 |
| 80% | 555 | 742 |
| 90% | 575 | 756 |
| EP | 617 | 802 |
| Percent recovered | 99.0 | 98.0 |
| Percent residue | 1.0 | 2.0 |
| Percent loss | 0.0 | 0.0 |

*ASTM vacuum distillation.

TABLE II

Inspections of raw materials—Elemental analyses (wt. percent)

| | Carbon | Hydrogen | Sulfur | Ash | Oxygen [1] |
|---|---|---|---|---|---|
| Cat. light gas oil (CLGO) | 87.24 | 11.70 | 0.39 | 00.0 | |
| Spent alkylation acid [2] | 6.66 | 3.49 | 29.75 | 00.26 | 60.07 |
| CLGO acid sludge | 40.00 | 5.54 | 17.75 | 0.007 | 36.70 |
| Roda coal [3] | 84.36 | 5.61 | 0.72 | 1.82 | [4] 7.49 |
| Acid coke (dried at 850° F.) | 82.62 | 4.61 | 5.60 | 0.52 | 6.65 |

[1] By difference.
[2] Generally used to make the acid sludge.
[3] A bituminous coal produced by Westmoreland Coal Co. and generally sold for metallurgical use, typically containing approximately (percent): 34.5 volatiles, 59.4 fixed carbon, 3.30 moisture, 2.80 ash, 0.58 sulfur.
[4] Represents chemically combined oxygen and nitrogen.

TABLE III

| Ex. | Carbon material | Carbon material/ acid sludge | Round- ness | Dried at— Temp., °F. | Dried at— Time, mins. | Density, gm./cc. Bulk | Density, gm./cc. True [1] |
|---|---|---|---|---|---|---|---|
| 1 | Acid coke | 1.7:1 | 0.8 | 850 | 30 | 0.55 | 13.5 |
| 2 | Lignite | 2.8:1 | 0.75 | 600 | 60 | 0.7 | 1.4 |
| 3 | Carbon black | 2.7:4 | 0.5 | 250 then 800 | 60 30 | 0.6 | 1.6 |
| 4 | Active carbon (Aqua Nuchar) | 1:3 | 0.8 | 250 then 600 | 120 60 | 0.457 | 1.6 |
| 5 | Cation exchange carbon (Zeocarb) | 1:1 | 0.9 | 212 then 350 | 60 30 | 0.63 | 1.4 |
| 6 | High-surface area active carbon (Columbia ACC) | 1:4.5 | 0.55 | 250 then 600 | 120 60 | 0.6 | 1.8 |
| 7 | Bituminous coal (Roda coal) | 2.1:1 | 0.9 | 250 then 600 | 60 60 | 0.6 | 1.3 |
| 8 | Acid coke | 1:3.45 | 0.7 | 850 | 30 | 0.56 | 1.3 |

[1] True density by helium pycnometer.

TABLE IV.—TYPICAL SIEVE ANALYSES

| | Wt. percent on sieves | |
|---|---|---|
| | Roda coal | Acid coke |
| Mesh size (ASTM): | | |
| 80 | | 0.4 |
| 115 | 1.2 | 2.4 |
| 170 | 3.2 | 6.8 |
| 250 | 7.3 | 16.0 |
| 325 | 60.1 | 25.6 |
| Pan | 28.2 | 48.8 |
| Avg. diam. (microns) | 49.4 | 48.4 |
| Bulk density (gm./cc.) | 0.65 | 0.73 |
| True density (gm./cc.) [1] | 1.28 | 1.37 |

[1] Helium pycnometer.

TABLE V

| Ex. | Carbon material | Activation conditions Temp., °C. | Activation conditions Time, min. | Activation conditions Atmosphere [1] | Weight percent CCl₄ pick-up | Density, gm./cc. Bulk | Density, gm./cc. True [2] |
|---|---|---|---|---|---|---|---|
| 1a | Acid coke | 980 | 120 | N₂ plus steam | 77.9 | 0.353 | 2.14 |
| 1b | do | 980 | 40 | Air plus steam | 79.0 | 0.328 | 2.04 |
| 2 | Lignite | 930 | 90 | N₂ plus steam | 40.2 | 0.290 | 2.11 |
| 3 | Carbon black | 930 | 45 | do | 43.8 | 0.352 | 1.92 |
| 4 | Active carbon (Aqua Nuchar A) | 930 | 45 | do | 86.9 | 0.316 | 1.90 |
| 5 | Cation exchange carbon (Zeocarb) | Dried at 350° F. for 15 minutes in forced draft oven as a thin film | | | | | |
| 6 | High surface area active carbon (Columbia ACC) | 930 | 25 | N₂ plus steam | 80.3 | 0.452 | 2.07 |
| 7a | Bituminous coal (Roda coal) | 980 | 120 | do | 68.3 | 0.465 | 2.00 |
| 7b | do | 980 | 40 | Air plus steam | 66.1 | 0.447 | 2.01 |
| 7c | Austin Black | 930 | 135 | N₂ plus steam | 49.7 | 0.641 | 1.94 |

[1] Atmosphere at 54 mol. percent steam.
[2] True density by helium pycnometer.

I claim:

1. A method of forming a shaped article comprising (a) depositing a mineral acid sludge comprising at least 5 percent by weight hydrocarbons in a mixing zone, said acid sludge comprising the reaction product of a mineral acid with a predominantly aromatic or unsaturated hydrocarbon or a mixture thereof, (b) combining a sufficient quantity of a finely divided substantially moisture-free carbon material selected from the group consisting of petroleum coke, acid coke, wood charcoal, bituminous coal, lignite, carbon black, and charred vegetable materials having particles smaller than 42 Tyler mesh with said acid sludge, (c) mixing said carbon material and said acid sludge in ratios in the range of from 5:1 to 1:5 parts by weight of carbon material to acid sludge and (d) forming the mixture from (c) into said shaped article by a folding or tumbling mixing action at a temperature between 0° C. and 150 C., said shaped article being nonadherent beads, having a nominal diameter of from 0.020 inch to about 0.50 inch and, a roundness in the range of about 0.5 to 1.0.

2. The method of claim 1 comprising in addition the step of drying said article at a temperature in the range of from about 180° F. to about 600° F. to drive off moisture and mineral acid values to form a dried article.

3. The method of claim 2 comprising the additional step of heat-treating said dried article at a sintering temperature in the range of from about 600° F. to about 1500° F. to form a sintered article.

4. The method of claim 3 comprising in addition the step of activating said sintered article by contacting said sintered article with a mildly oxidizing gas at a temperature in excess of 1500° F.

References Cited

UNITED STATES PATENTS

| 2,635,709 | 4/1953 | Archibald | 183—114.2 |
| 2,586,889 | 2/1952 | Vesterdal | 196—148 |
| 2,412,667 | 12/1946 | Arveson | 23—177 |
| 2,263,766 | 11/1941 | Fentress | 23—177 |
| 2,790,781 | 4/1957 | Moise | 252—421 |
| 2,790,782 | 4/1957 | Hillard | 252—421 |
| 2,718,505 | 9/1955 | Baker | 252—421 |

DANIEL E. WYMAN, Primary Examiner

P. M. FRENCH, Assistant Examiner

U.S. Cl. X.R.

252—445, 444

PO-1050
(5/69)

UNITED STATES PATENT OFFICE
CERTIFICATE OF CORRECTION

Patent No. 3,592,779      Dated July 13, 1971

Inventor(s) Oliver A. Kiikka

It is certified that error appears in the above-identified patent and that said Letters Patent are hereby corrected as shown below:

Column 2, line 41, "grams" should be ---gram---.

Column 2, line 52, "adsortpion" should be ---adsorption---.

Table III

"1" under "Ex." column should be opposite "Acid coke".

Insert "2" under "Ex." column opposite "Lignite".

Line 3 under "Carbon material/acid sludge" should be opposite Ex. 3.

Line 3 under "Roundness" should be opposite Ex. 3.

Signed and sealed this 21st day of March 1972.

(SEAL)
Attest:

EDWARD M. FLETCHER, JR.
Attesting Officer

ROBERT GOTTSCHALK
Commissioner of Patents